July 28, 1925.

E. BUCKINGHAM

HOB

Filed March 13, 1922

Inventor
Earle Buckingham,
By Wayne B Wells
Attorney

July 28, 1925.

E. BUCKINGHAM 1,547,559

HOB

Filed March 13, 1922

Inventor
Earle Buckingham,
By Wayne B Wells
Attorney

Patented July 28, 1925.

1,547,559

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

HOB.

Application filed March 13, 1922. Serial No. 543,404.

*To all whom it may concern:*

Be it known that I, EARLE BUCKINGHAM, a citizen of the United States, residing at Hartford, in the county of Hartford and State of Connecticut, have invented certain new and useful Improvements in Hobs, of which the following is a specification.

My invention relates to hobs and particularly to hobs for cutting involute gear teeth. One object of my invention is to provide a hob that shall have the tops and the sides of the teeth so relieved as to permit the grinding of the front cutting faces without changing the contour cut by them and that shall have true involute helicoids formed on the sides of the teeth.

Another object of my invention is to provide a hob that shall have the teeth formed in a thread by either straight or inclined flutes, the front cutting faces formed on the teeth by the flutes being either radially or non-radially arranged and the sides and the tops of the teeth being relieved, and that shall have the sides of the teeth in the form of true involute helicoids.

Another object of my invention is to provide a hob that shall have undercut teeth formed by straight or inclined flutes, the tops of the teeth being radially relieved and the sides of the teeth being axially relieved and in the form of involute helicoids, and that shall have the side cutting edges of the teeth contour ground in accordance with the lead of the hob thread.

A further object of my invention is to provide a hob that shall have teeth formed by either straight or inclined flutes, the teeth having either non-radially or radially arranged cutting faces formed on them by the flutes, the sides of the teeth being axially relieved and in the form of true involute helicoids, and the tops of the teeth being so radially relieved as to maintain the width across the top of each tooth substantially constant. Moreover, the hob shall not only have the front cutting faces of the teeth ground but also the side cutting edges, the grinding of the side cutting edges being very slight and in accordance with the lead of the hob thread.

The first conception of a hob for cutting teeth on gear wheels was a worm wherein an axial section is the same as the rack which is used as the basis for the gear system. Each side of such a worm is formed by a tool having a straight cutting edge making a predetermined angle with a plane perpendicular to the blank axis and extending along a line passing through the blank axis. The straight cutting edge is assumed to be revolved and advanced with a uniform lead. The intersection of the surface so formed with a plane perpendicular to the blank axis is an Archimedes spiral and not an involute as in a hob constructed in accordance with my invention. A hob so formed will not cut involute teeth on a gear wheel with the accuracy of a hob which is formed in accordance with my invention and is provided with teeth, the sides of which are true involute helicoids.

When a hob has been formed by a radially arranged cutting edge, as above set forth, it is difficult to grind and maintain the surfaces of the sides of the hob teeth. It is well known that it is not possible to accurately grind a continuous screw thread with any degree of accuracy unless the lead of the thread is very small. The reason for the difficulty in grinding the screw thread is the inability of a grinding wheel to cut along the same cutting line by which the thread is formed. If it is difficult to grind a continuous screw thread, it is apparent that a relieved screw thread which is attempted on the sides of the hob teeth is even more difficult to grind. Therefore, in grinding screw thread hobs, it is apparent two errors are introduced, the theoretical error of the surface and the error effected in attempting to grind relieved screw threads.

Although a screw thread hob formed in the above indicated manner will approximately cut true involute gear teeth, it is a very difficult matter, as above set forth, to grind the side surfaces of the hob teeth. During the hardening process, the teeth of a hob are more or less distorted. Accordingly, it is necessary to grind the teeth of the hob, if gear teeth are to be cut with precision. It is difficult to grind the side screw surfaces of a hob formed in the above indicated manner inasmuch as there is no tangent plane along the cutting edge which is used to form a screw surface.

In a hob constructed in accordance with my invention, the side surfaces of the teeth are relieved in the form of true involute helicoids. The cutting edges of the sides of the teeth are contour ground in a manner to be hereinafter set forth. A hob, constructed in accordance with my invention, may have teeth formed thereon by either straight or helical flutes and the cutting faces formed on the teeth by the flutes may be either radially arranged or non-radially arranged. The straight flutes are preferred in manufacturing a hob inasmuch as the hob is generally set at an angle with respect to the work being operated on and accordingly straight flutes effect a more even cutting action by the teeth. Non-radially arranged or undercut teeth are preferred by reason of the sharper cutting action effected by them. The tops of the teeth are radially relieved to such an extent that the width on top of each tooth is maintained substantially constant.

Reference may be had to my copending application Serial No. 543,403 filed March 13, 1922, in which is disclosed methods for forming hobs having teeth provided with involute helicoidal surfaces. Moreover, in such application is disclosed more fully the advantages of an involute helicoidal surface in constructing a hob.

Hobs, which are formed in accordance with my invention, are particularly adapted to form involute teeth on gear wheels but are not necessarily limited to such operation. Hobs may be formed in accordance with my invention for cutting screw threads, threads on taps and worm threads, and moreover, for performing various other similar operations.

In forming a hob from a blank in accordance with my invention, a thread is preferably first formed on a blank by means of a suitable formed milling cutter. The thread so formed does not have true involute helicoidal surfaces but has surfaces which are approximately involute helicoids. Such thread is cut to true helicoidal surfaces by straight cutting edges which are tangent to the base cylinder of the desired involute helicoid and make a predetermined angle with planes perpendicular to the blank axis. One cutting edge serves to cut one side of the thread whereas the other cutting edge serves to cut the other side of the thread. Such cutting edges may, if so desired, operate simultaneously on the blank. When operating simultaneously on the blank, the cutting edges are located in the angular position above set forth and tangent to the base cylinder of the desired involute on opposite sides of the blank axis. If so desired, the same cutting tool may be utilized for cutting true involute helicoidal surfaces on each side of the thread. In such case one side of the blank thread is first cut to a true involute helicoid and then the position of the blank is reversed and the other side of the thread is cut to a true involute helicoid by the same cutting tool and the same straight cutting edge. Upon cutting the sides of the thread to true involute helicoids, suitable flutes are cut on the blank through the thread. Such flutes may be axial or spiral as desired. The inclination of the spiral flutes may be in either direction, as desired, according to the character of the work being operated on. Moreover, the cutting faces of the teeth, which are formed by the flutes, may be radially or non-radially arranged, as desired. It should also be noted that the thread which is formed on the blank may be a right-hand or a left-hand thread, as desired.

It is customary to provide straight flutes in order to give a more even cutting action. However, straight flutes will not give such a smooth cutting action if the hob is set square with the work or the generating rack. The hob may be set at any desired angle relative to the work. The flutes should also be formed on the hob in accordance with the helix angle or lead on the hob. If the helix angle of the hob is relatively large, the use of straight flutes will result in a blunt cutting edge on one side of each hob tooth and a relatively acute angle on the other side of each tooth. In such case, it is necessary to use helical cutting flutes which will be substantially perpendicular to the helix of the hob in order to maintain suitable cutting edges.

Upon forming of teeth on the hob by cutting flutes through the thread, the side cutting edges of the teeth are axially relieved and the top cutting edges are radially relieved. The axial relief on the teeth is preferably effected by means of a formed lathe tool which is matched to the form of the teeth at the side cutting edges formed by the hob flutes. Each side of the teeth is relieved by such a relieving tool in the usual and customary manner. Upon completion of the axial relief on the hob teeth, the tops of the teeth are radially relieved in the customary and usual manner. The tops of the hob teeth must be radially relieved to such an extent that the width of the teeth at the top is approximately uniform. When axial relief is employed, it is apparent the hob teeth must be lengthened somewhat so that the bottom of the flues will clear the outside diameter of the gear blank when the hob is somewhat worn.

After hardening, the front cutting faces of the teeth are ground in accordance with the inclination of the flutes and preferably the side cutting edges are so ground as to make very little or slight drag. It, of course, will be preferable to grind the side relieved surfaces but such operation is somewhat expensive and a slight contour grinding of the side cutting edges produces satisfactory results.

The side cutting edges are ground to true involute helicoids having the same lead as the lead on the hob thread. Inasmuch as the sides of the teeth have been axially relieved to an appreciable extent, it is apparent the contour grinding of the side cutting edges will produce only a very narrow ribbon of ground surface on the sides of each tooth. Such ribbon will be so narrow as not to produce any appreciable lag or drag. The front cutting faces of the teeth should be ground in the usual manner in conformity with the direction of the flutes and in conformity with the front cutting faces of the teeth. The front cutting faces of the teeth may be ground a number of times without contour grinding the side cutting edges of the teeth. Reference may be had to my companion application Serial No. 543,403 above referred to for a more complete description of the method utilized in forming a hob in accordance with my invention.

Figure 1:
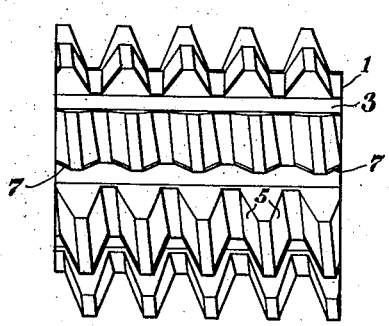
Figures 1 and 2 are respectively side and end elevational views of a hob constructed in accordance with my invention.
Figure 2:
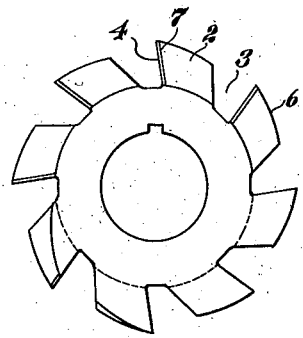

Referring to Figs. 1 and 2 of the drawings, a hob 1 is shown having teeth 2 formed in a continuous thread by means of straight flutes 3. Non-radially arranged cutting faces 4 are formed on the teeth by the flutes 3. The sides 5 of the teeth 2 are in the form of true involute helicoids and are relieved by the so-called axial relief. The tops of the teeth are relieved along lines extending backwardly and inwardly from the front cutting faces by the so-called radial relief. The tops of the teeth are radially relieved to such an extent that the width of the top of each tooth is maintained substantially constant. By so forming the teeth on a hob, it is possible to grind the front cutting faces 4 without changing the shape of the teeth cut by the hob.

In a hob of the above indicated character, it is necessary to increase the height of the tooth in front in order to prevent interference between the work and the bottom of the flutes when the tooth is ground back somewhat. Narrow ribbons of ground surface 7 are formed on the sides of each tooth back of the side cutting edges. The narrow ribbon of ground surface on each side of the teeth has a lead corresponding to the lead of the hob thread and differing from the lead of either of the involute helicoids on the sides of the teeth. Referring to Fig. 2 of the drawings, a portion of an involute is shown on the sides of two of the teeth. In hobs constructed in accordance with my invention and having teeth provided with sides having true involute helicoids, a section perpendicular to the axis of the hob will always show involutes. Although a hob having a right-hand thread is shown in Figs. 1 and 2 of the drawings, it is to be understood that such hob may have a left-hand thread if so desired.

Figure 3:
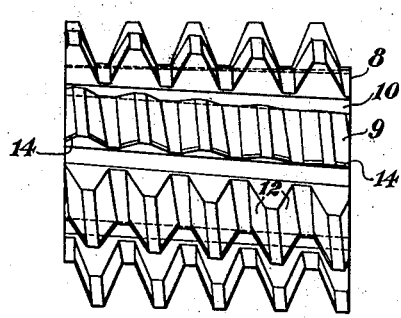
Figs. 3 and 4 are respectively side and end elevational views of a hob having teeth provided with radially arranged cutting faces formed by inclined flutes.
Figure 4:
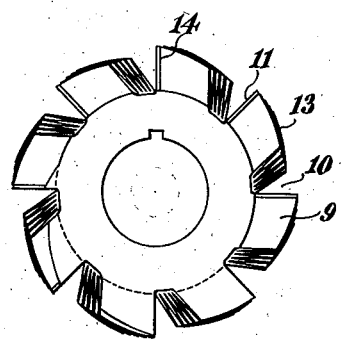

Referring to Figs. 3 and 4 of the drawings, a hob 8 is shown having teeth 9 formed in a continuous thread by means of helical flutes 10. The front cutting faces 11 of the teeth are radially arranged as shown in Fig. 4 of the drawings. The sides 12 of the teeth 9 are relieved by the so-called axial relief and are in the form of true involute helicoids. The tops 13 of the teeth are relieved by the so-called radial relief and to such an extent as to maintain the width of the teeth on top substantially constant. The front cutting faces 11 of the teeth are ground and a narrow ribbon 14 is ground on the side of each tooth adjacent to the front cutting edge. Such narrow ribbons of ground surfaces on the sides of the teeth are unrelieved and have a lead corresponding to the lead of the hob thread. The width of the ribbon does not exceed a thirty-second of an inch and accordingly does not produce any appreciable drag on the hob when it is operating on a piece of work. The hob is sharpened by grinding the front cutting faces 11 in conformity with the flutes 10. When the front cutting faces are ground back beyond the narrow ribbon of ground surfaces on the sides of the teeth, it is necessary to again contour grind the sides of the teeth. A hob shown in Figs. 3 and 4 may be provided with a left hand thread if so desired.

Figure 6:
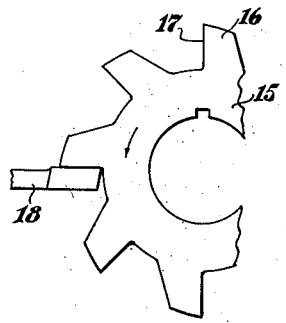
Figs. 6 and 7 are diagrammatic views showing the positions of a formed lathe tool for axially relieving hobs having teeth provided with radially arranged cutting faces and teeth provided with non-radially arranged cutting faces.

Referring to Fig. 6 of the drawings, a hob 15 is shown having teeth 16 provided with radially arranged cutting faces 17, which are similar to the cutting faces on the hob shown in Figs. 3 and 4 of the drawings. The hob 15 is assumed to rotate in a counterclockwise direction as indicated by the arrow. A cutting tool 18 is shown in engagement with one of the teeth 16 and having a cutting edge located on a radial line. The cutting edge is matched to one side of a tooth which has unrelieved involute helicoidal sides. With the cutting tool 18 and the hob 15 in such position, the sides of the teeth may be relieved in the customary and usual manner. A true involute helicoidal thread may be formed on the blank prior to the relieving operation either by the methods disclosed in my copending application, Serial No. 543,403 above referred to or by the method disclosed in the pending application of Ernest Wildhaber, Serial No. 543,385 filed March 13, 1922.

Figure 5:
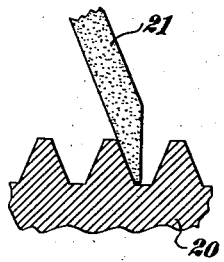
Fig. 5 is a diagrammatic view showing the position of the grinding wheel for contour grinding one side cutting edge.

Referring to Fig. 5 of the drawings, a section of a portion of a hob 20 is shown in engagement with the flat surface of a grinding wheel 21. By means of such a grinding wheel, the contour grinding of the side cutting edges of the teeth is effected. The contour grinding of the side cutting edges of the teeth may be also effected by a conical grinding wheel in the manner set forth in the application, Serial No. 543,385 of Ernest Wildhaber.

Figure 7:
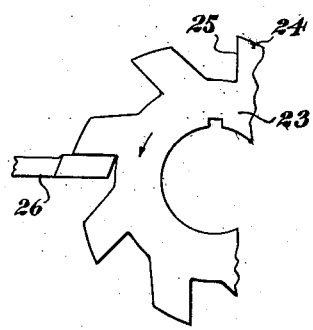

Referring to Fig. 7 of the drawings, a hob 23 is shown having teeth 24 provided with non-radially arranged cutting faces 25. A cutting tool 26 is shown in position for relieving the involute helicoidal sides of the teeth. The hob is assumed to rotate in a counter clockwise direction as indicated by the arrow. The cutting edge of the tool 26 is shown parallel to one cutting face of the teeth 24 and moreover is ground to match the side of the tooth with which it is in engagement. In this regard, it will be noted the cutting edge of the tool 26 is located a distance above the axis of the hob equal to the radius of the so-called undercut circle. With the hob 23 and the cutting tool 26 in the position above described, the relieving of the sides of the teeth is effected in the customary and usual manner. The method disclosed in Figs. 6 and 7 of the drawings is only one method of relieving teeth having true involute helicoidal sides. It is to be understood that other methods such for example as the methods disclosed in the application of Ernest Wildhaber, Serial No. 543,385 above referred to may be utilized. In relieving the teeth in accordance with the method disclosed in Figs. 6 and 7 of the drawings, the flutes may be straight or may be inclined in either direction and moreover the hob may have either right-hand or left-hand threads.

Figure 8:
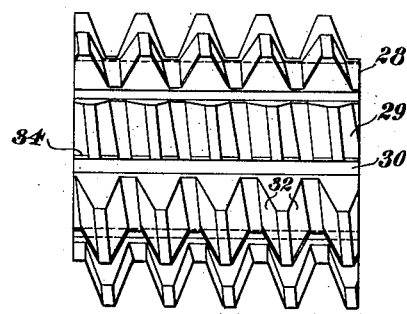
Figs. 8 and 9 are respectively side and end elevational views showing a hob having radially arranged cutting faces formed by straight flutes.
Figure 9:
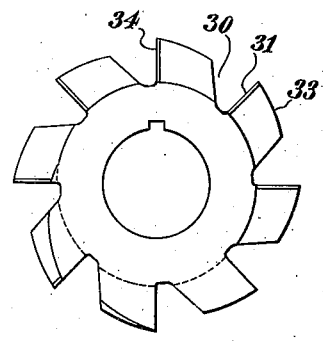

Referring to Figs. 8 and 9 of the drawings, a hob 28 is shown provided with teeth 29 which are formed in a continuous thread by means of straight flutes 30. The front cutting faces 31 of the teeth, which are formed by the flutes 30, are radially arranged as shown in Fig. 9 of the drawings. The sides 32 of the teeth are in the form of true involute helicoids and are relieved by the so-called axial relief. The tops 33 of the teeth are relieved by the so-called radial relief and are relieved to such an extent as to maintain the width of the teeth on top substantially constant. Narrow ribbons 34 of unrelieved ground surfaces are formed on the sides of the teeth. Such narrow ribbons of ground surfaces are true involute helicoids having a lead equal to the lead of the hob thread and differing from the lead of the involute helicoids on either side of the hob teeth. The height of the hob teeth is increased somewhat in front in order to prevent interference between the work and the bottom of the flutes when the teeth have been ground back somewhat. It will be noted that the hob shown in Figs. 8 and 9 differs from the hob shown in Figs. 1 and 2 chiefly in the arrangement of the front cutting faces of the teeth. The hob shown in Figs. 8 and 9 may have a left-handed thread if so desired.

Figure 10:
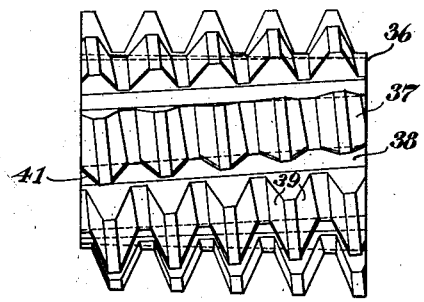
Figs. 10 and 11 are respectively side and end elevational views of a hob having non-radially arranged cutting faces formed by inclined flutes.
Figure 11:
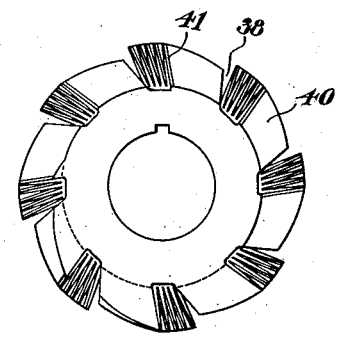

In Figs. 10 and 11 of the drawings, a hob 36 is shown having teeth 37 formed in a continuous thread by means of helical flutes 38. The sides 39 of the teeth are in the form of true involute helicoids and are relieved by the so called axial relief. The tops 40 of the teeth are radially relieved to such an extent that the width of the tops of the teeth is substantially constant. Thus, the teeth may be ground on the front cutting faces without changing the contour of the teeth cut by the hob. The height of the teeth is increased somewhat in order to prevent interference between the work and the bottom of the flutes when the teeth are ground back somewhat. Narrow ribbons 41 of unrelieved surfaces are ground back of the side cutting edges of the teeth. Such narrow ribbons are in the form of true involute helicoids having the lead of the hob thread.

It will be understood that such changes and modifications may be made in my invention as fall within the limits of the appended claims.

What I claim is:

1. A hob, comprising teeth arranged in rows, the side surfaces of the teeth being axially relieved and in the form of helicoids, whereby the effective contour behind the cutting face of each tooth is the same at successive surfaces of intersection inclined similarly to the initial cutting face.

2. A hob, comprising teeth having non-radially arranged cutting faces, the side surfaces of the teeth being axially relieved and in the form of helicoids so that the effective contour behind each cutting face is the same at successive surfaces of intersection inclined similarly to the initial cutting face, whereby the teeth may be ground on the front cutting faces without changing the effective contour cut thereby.

3. A hob, comprising teeth having non-radially arranged cutting faces, the side surfaces of the teeth being axially relieved and in the form of involute helicoids so that the effective contour behind each cutting face is the same at successive surfaces of intersection inclined similarly to the initial cutting face, whereby the teeth may be ground on the front cutting faces without changing the effective contour cut thereby.

4. A hob, comprising teeth arranged in the form of a thread, the front cutting faces of the teeth being formed by flutes each of which is located in a plane including the hob axis, the tops of the teeth being radially relieved, and the side surfaces of the teeth being axially relieved and in the form of involute helicoids so that the effective contour behind each cutting face is the same at successive surfaces of intersection inclined similarly to the initial cutting face, whereby the teeth may be ground on the front cutting faces without changing the effective contour cut thereby.

5. A hob, comprising a thread having teeth formed therein by flutes, the tops and the sides of said teeth being relieved, and the side surfaces of the teeth being in the form of involute helicoids.

6. A hob, comprising a thread having teeth formed therein by flutes each of which is located in a plane including the hob axis, the tops and the sides of the teeth being relieved and the side surfaces of the teeth being in the form of involute helicoids.

7. A hob, comprising a thread having undercut teeth formed therein by flutes each of which is located in a plane including the hob axis, the tops and sides of the teeth being relieved and the side surfaces of the teeth being in the form of helicoids, whereby the teeth may be ground on the front cutting faces without changing the effective contour cut thereby.

8. A hob, comprising a thread having undercut teeth formed therein by flutes each of which is located in a plane including the hob axis, the tops and the sides of the teeth being relieved and the side surfaces of the teeth being in the form of involute helicoids.

9. A hob, comprising a thread having undercut teeth formed therein by flutes each of which is located in a plane including the hob axis, the tops of the teeth being radially relieved and the side surfaces of the teeth being axially relieved and in the form of helicoids, whereby the teeth may be ground on the front cutting faces without changing the effective contour cut thereby.

10. A hob, comprising a thread having undercut teeth formed therein by flutes each of which is located in a plane including the hob axis, the tops of the teeth being radially relieved and the side surfaces of the teeth being axially relieved and in the form of involute helicoids.

11. A hob, comprising a thread having teeth formed therein by flutes each of which is located in a plane including the hob axis, the tops and the sides of the teeth being relieved, the side surfaces of the teeth being in the form of helicoids and the side cutting edges of the teeth being ground in conformity with the lead of the thread and the contour of the teeth.

12. A hob, comprising a thread having teeth formed therein by flutes, the tops and the sides of the teeth being relieved, the side surfaces of the teeth being in the form of involute helicoids, and the side cutting edges of the teeth being ground in conformity with the lead of the thread and the contour of the teeth.

13. A hob, comprising a thread having undercut teeth formed therein by flutes each of which is located in a plane including the hob axis, the tops of the teeth being radially relieved, the side surfaces of the teeth being axially relieved and in the form of helicoids and the side cutting edges of the teeth being ground in conformity with the lead of the thread and the contour of the teeth.

14. A hob, comprising a thread having undercut teeth formed therein by flutes each of which is located in a plane including the hob axis, the tops of the teeth being radially relieved, the side surfaces of the teeth being axially relieved and in the form of involute helicoids, and the side cutting edges of the teeth being ground in conformity with the lead of the thread and the contour of the teeth.

15. A hob, comprising a thread having teeth formed therein by flutes each of which is located in a plane including the hob axis, the front cutting faces of the teeth being non-radially arranged, the tops of said teeth being radially relieved, the side surfaces of said teeth being axially relieved and in the form of involute helicoids, and the side cutting edges of the teeth being ground in conformity with the lead of the thread and the contour of the sides of the teeth.

16. A hob, comprising teeth arranged to form a thread, the side surfaces of the teeth being axially relieved and in the form of helicoids so that the effective contour behind each cutting face is the same at successive surfaces of intersection inclined similarly to the initial cutting face, and the side cutting edges of the teeth being ground in conformity with the lead of the thread and the contour of the sides of the teeth.

17. A hob, comprising teeth arranged in the form of a thread and having non-radially arranged cutting faces, the side surfaces of the teeth being axially relieved and in the form of involute helicoids so that the effective contour behind each cutting face is the same at successive surfaces of intersection inclined similarly to the initial cutting face, and the side cutting edges of the teeth being ground in conformity with the lead of the thread and the contour of the sides of the teeth.

18. A hob with curved sided threads having one or more helical series of teeth whose side faces comprise helicoidal surfaces of uniform lead at all diameters of the hob.

In testimony whereof, I hereto affix my signature.

EARLE BUCKINGHAM.